(12) United States Patent
Scag et al.

(10) Patent No.: US 6,286,293 B1
(45) Date of Patent: Sep. 11, 2001

(54) LAWN MOWER CUTTING BLADE SPINDLE ASSEMBLY

(75) Inventors: Dane T. Scag, Elm Grove, WI (US); Mark C. Bland, New Albany, IN (US)

(73) Assignee: Great Dane Power Equipment, Inc., Elm Grove, WI (US)

( * ) Notice: Subject to any disclaimer, the term of this patent is extended or adjusted under 35 U.S.C. 154(b) by 0 days.

(21) Appl. No.: 09/528,016

(22) Filed: Mar. 17, 2000

(51) Int. Cl.[7] .................................................. A01D 34/03
(52) U.S. Cl. .................................. 56/17.5; 56/255; 56/295
(58) Field of Search ........................... 56/255, 295, 17.5, 56/11.3, DIG. 17, DIG. 20, DIG. 22

(56) References Cited

U.S. PATENT DOCUMENTS

| | | | |
|---|---|---|---|
| 3,722,642 | * | 3/1973 | Zurek et al. ........................... 192/8 R |
| 3,798,987 | * | 3/1974 | Hurd et al. ...................... 74/230.01 R |
| 3,875,728 | * | 4/1975 | Bacon ..................................... 56/17.5 |
| 3,894,383 | * | 7/1975 | Weis et al. ............................. 56/17.5 |
| 3,897,678 | * | 8/1975 | Zurek et al. ........................... 56/11.3 |
| 3,967,438 | * | 7/1976 | Tombers ................................. 56/113 |
| 4,366,995 | * | 1/1983 | Kocian .................................... 308/26 |
| 4,478,029 | | 10/1984 | Moore et al. .......................... 56/17.5 |
| 4,989,398 | | 2/1991 | Kuhn et al. ............................ 56/17.5 |
| 5,117,617 | * | 6/1992 | Scag ....................................... 56/17.5 |
| 5,481,857 | * | 1/1996 | Umemoto et al. ..................... 56/12.6 |
| 5,483,790 | * | 1/1996 | Kuhn et al. ............................ 56/17.5 |
| 5,507,586 | * | 4/1996 | Myszka ................................. 403/365 |
| 5,782,073 | | 7/1998 | Sheldon ................................. 56/17.5 |
| 5,960,617 | * | 7/1998 | Sheldon ................................. 56/17.5 |

\* cited by examiner

Primary Examiner—Robert E. Pezzuto
Assistant Examiner—Árpád Fábián Kovács
(74) Attorney, Agent, or Firm—Godfrey & Kahn, S.C.

(57) ABSTRACT

A lawn mower cutting blade spindle assembly having an elongate spindle shaft and a spindle shoulder projecting radially outward from the lower end thereof. A bearing assembly mounted within a spindle housing provides rotational support for the spindle shaft. Mounted on the upper end of the spindle shaft is at least one pulley configured to be driven by a drive belt connected to the mower's engine. A compression nut screwed onto the upper end of the spindle shaft is used to place the pulley or pulleys and bearing assembly in compression against the top face of the spindle shoulder. The spindle assembly also includes a cutting blade attached to the bottom face of the spindle shaft with a through-bolt and cutting blade attachment nut. Significantly, the cutting blade can be detached from the bottom face of the spindle shoulder without disturbing the compression placed on the pulley or pulleys and bearing assembly.

27 Claims, 3 Drawing Sheets

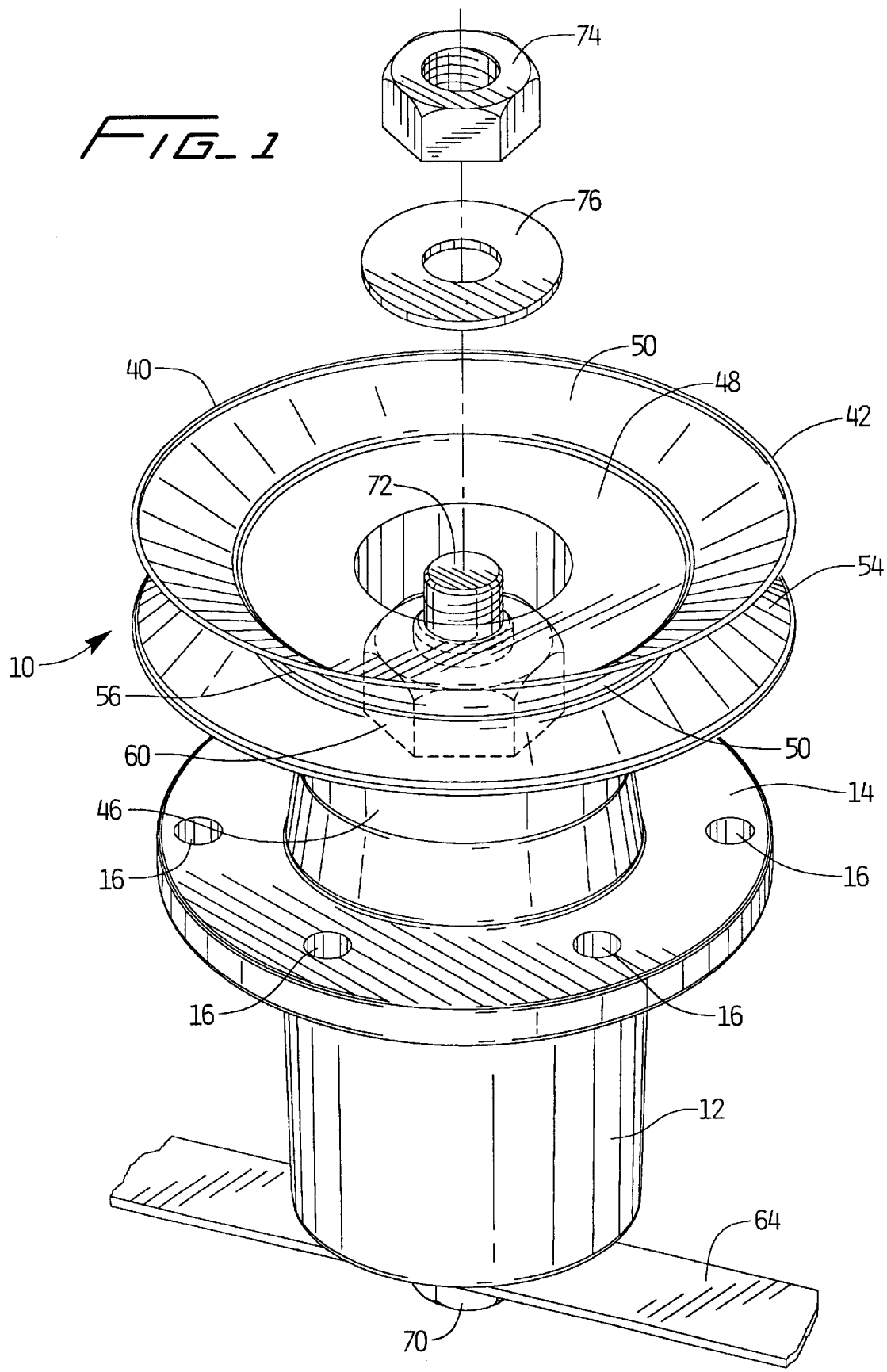
FIG_1

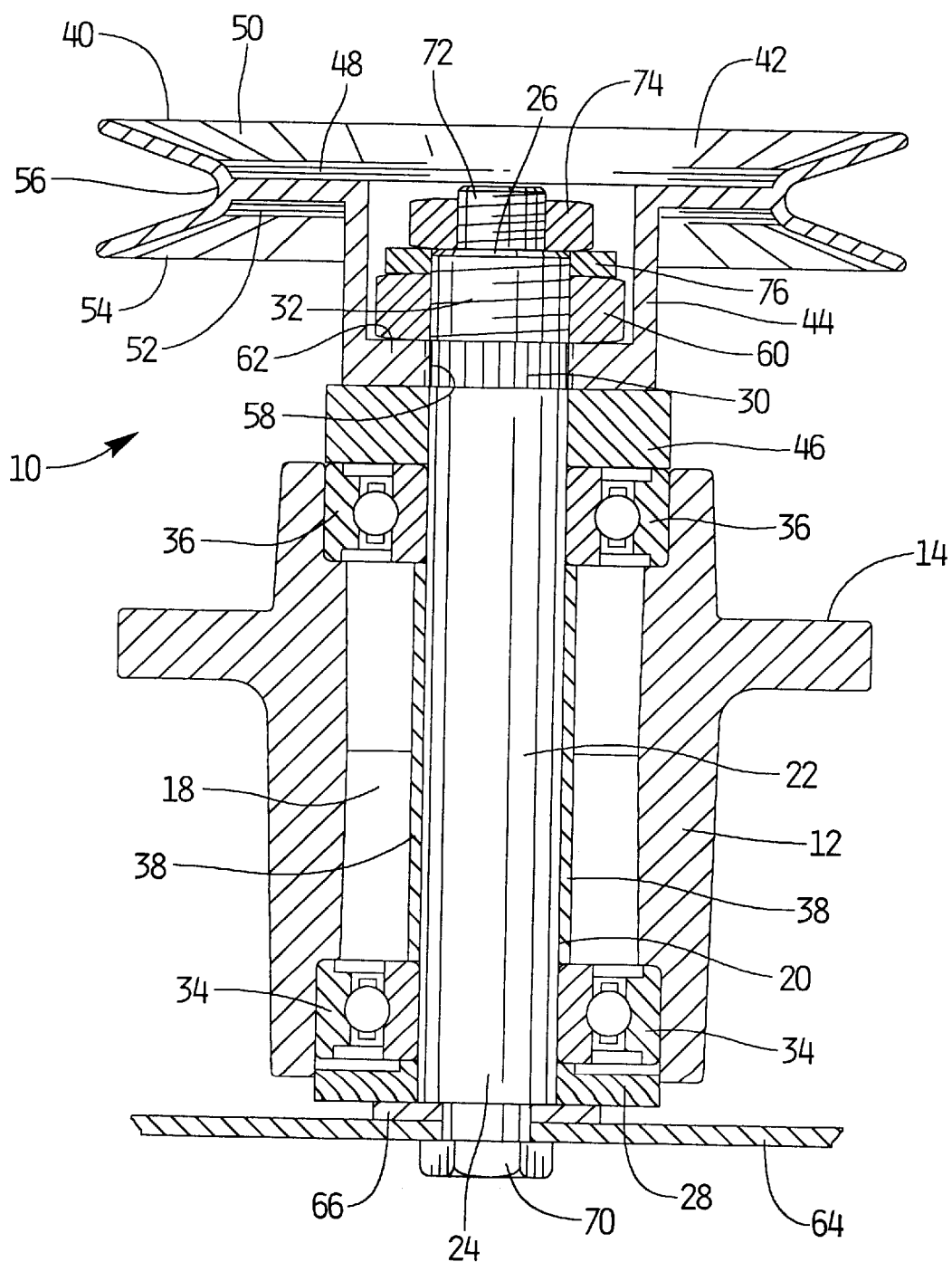
FIG_2

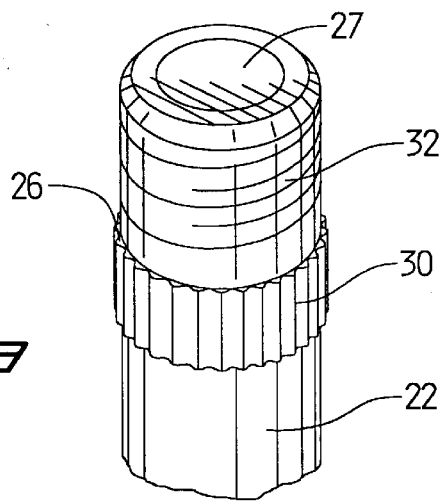
FIG_3
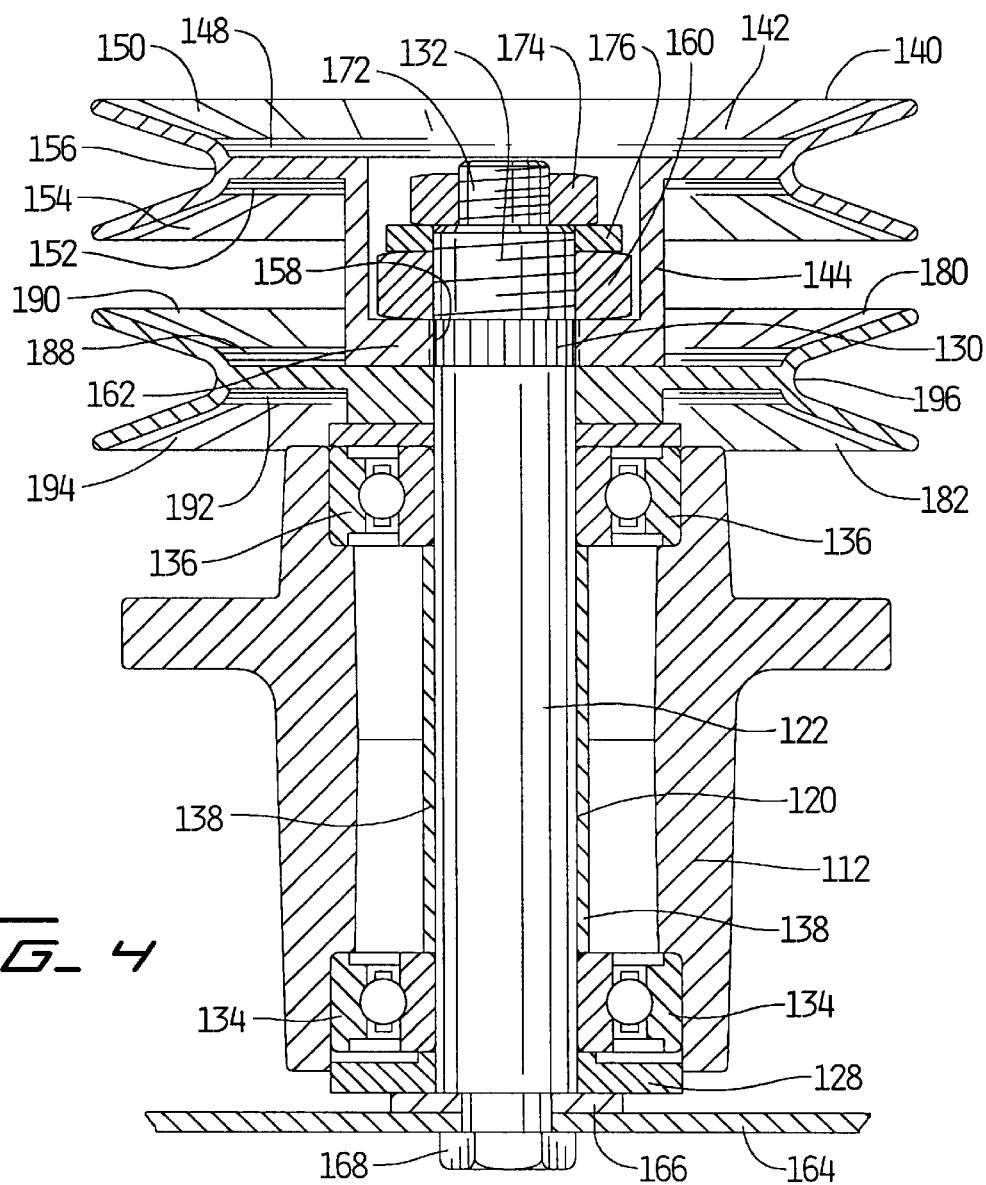
FIG_4

LAWN MOWER CUTTING BLADE SPINDLE ASSEMBLY

BACKGROUND OF THE INVENTION

The present invention relates generally to lawn mowers and, more particularly, to a lawn mower cutting blade spindle assembly which includes a cutting blade that can withstand impact loading and that can easily be detached from the mower without disturbing the pre-set compression applied to the other components of the spindle assembly.

Conventional lawn mowers utilize a rotatable cutting blade mounted underneath the mower's cutting deck to cut grass, vegetation and the like. Typically in commercial lawn mowers, the cutting blade is attached to the lower end of an elongate spindle shaft that is vertically supported by various bearings and bearing spacers within a spindle housing carried by the mower frame. The upper end of the spindle shaft projects above the spindle housing and has a pulley attached thereto that is configured to receive a drive belt connected to the mower's engine. In operation, the engine activates the drive belt to generate rotation of the pulley, which in turn causes rotation of the spindle shaft, which in turn causes rotation of the cutting blade to thereby cut the grass.

Periodically, the user of such a lawn mower will find it necessary to detach the cutting blade from the mower for the purpose of sharpening the blade, adjusting the height of the cut, or for general maintenance purposes. Therefore, most commercial lawn mowers are designed such that the user can easily detach the cutting blade from the spindle shaft to perform the required maintenance, and then reattach the cutting blade to the spindle shaft after such maintenance has been performed. Preferably, this detachment/reattachment process can be done in the field using ordinary tools.

Some lawn mowers are designed such that the cutting blade is attached to the mower with a short bolt that passes through the cutting blade and into a tapped end of the spindle shaft. The user of the mower can easily detach the cutting blade from the mower by simply unscrewing the short bolt out of the spindle shaft, and can reattach the cutting blade to the mower by screwing the short bolt back into the spindle shaft. One problem with this design, however, is that the short bolt is prone to breakage when the cutting blade encounters thick vegetation, tree branches, stones, or other large objects that can retard or prevent rotation of the cutting blade. Even if the short bolt does not break, the threading in the tapped end of the spindle shaft may become stripped due to the relative movement between the spindle shaft and cutting blade upon impact loading. In either case, damage to the spindle assembly will necessarily result in failure of the lawn mower.

In an attempt to overcome these problems, some lawn mowers have been designed which utilize a longer bolt to attach the cutting blade to the mower. For example, in U.S. Pat. No. 5,782,073 to Sheldon, an elongate bolt passes through the cutting blade and extends upwardly through a longitudinal bore formed on the inside of the spindle shaft. A nut tightened onto the bolt at its upper end is used to attach the cutting blade to the spindle shaft. This longer bolt is not likely to break when the cutting blade strikes a large object. In addition, the nut can be sufficiently tightened onto the threaded upper end of the bolt to prevent relative movement between the cutting blade and spindle shaft upon impact loading.

While use of a longer bolt as disclosed in the Sheldon patent overcomes the problems associated with "short bolt" mowers, it has other shortcomings which can lead to failure of the mower. In particular, the nut that is used to attach the cutting blade to the spindle shaft is also used to compress the pulley and bearing assembly against the spindle shoulder. As such, the compression applied to the pulley and bearing assembly is lost whenever the nut is unscrewed to detach the cutting blade from the spindle shaft. Experience has shown that if the nut is not sufficiently tightened onto the bolt when the cutting blade is reattached to the spindle shaft, the pulley and bearing assembly will become loose and fail due to premature wear. Thus, this mower design is also vulnerable to failure.

SUMMARY OF THE INVENTION

Therefore, in view of the problems associated with the above types of lawn mowers, it is an object of the present invention to provide a lawn mower cutting blade spindle assembly which includes a cutting blade that 1) can easily be detached from and reattached to the mower in the field with the use of ordinary tools, 2) can withstand impact loading, and 3) can be detached from and reattached to the mower without disturbing the compression applied to the other components of the spindle assembly.

These and other objectives are met by the lawn mower cutting blade spindle assembly of the present invention. The spindle assembly comprises a spindle housing configured to mount to the frame of a lawn mower. Mounted within the housing is a spindle including an elongate spindle shaft and a spindle shoulder projecting radially outward from the lower end thereof. Also mounted within the housing is a bearing assembly which provides rotational support for the spindle.

Mounted on the upper end of the spindle shaft is at least one pulley which is configured to receive a drive belt connected to the mower's engine. The pulley has a mounting hub extending therebelow that is insertable over the upper end of the spindle shaft. In a preferred embodiment, the mounting hub has a splined opening that is designed to mate with a splined neck portion on the upper end of the spindle shaft. As such, the spindle shaft is fixed for rotation with the pulley.

The spindle assembly also includes a compression nut that can be screwed onto the upper end of the spindle shaft and tightened down against the bottom wall of the pulley mounting hub. As the compression nut is tightened, the bottom wall of the pulley mounting hub pushes down against the bearing assembly, which pushes down against and abuts the top face of the spindle shoulder. The torque applied to the compression nut should be sufficient to maintain the pulley and bearing assembly in compression between the compression nut and spindle shoulder so as to prevent these components from becoming loose and failing due to premature wear. Preferably, this process takes place during the initial factory assembly (or perhaps thereafter during service work performed in a maintenance shop) to ensure that the proper torque is applied thereto.

The spindle assembly has a cutting blade attached thereto, and to the mower, with an elongate through-bolt that passes through the cutting blade and extends upwardly through a longitudinal bore formed on the inside of the spindle shaft. A cutting blade attachment nut can be screwed onto the threaded upper end of the through-bolt to attach the cutting blade to the bottom face of the spindle shoulder. The torque applied to the cutting blade attachment nut can be any reasonable torque that fixes the cutting blade to the spindle for rotation therewith. As such, the process of detaching and reattaching the cutting blade from and to the mower can be performed in the field using ordinary tools. Significantly, the cutting blade can be detached from the bottom face of the spindle shaft without disturbing the pre-set compression applied to the pulley and bearing assembly during the initial factory assembly.

The present invention will be better understood from the following detailed description of the invention, read in connection with the drawings as hereinafter described.

DESCRIPTION OF THE DRAWINGS

FIG. 1 is an isometric view of a "single-pulley" lawn mower cutting blade spindle assembly constructed in accordance with a first embodiment of the present invention, shown with the cutting blade attachment nut disassembled therefrom;

FIG. 2 is a cross-sectional view of the "single-pulley" lawn mower cutting blade spindle assembly of FIG. 1;

FIG. 3 is an isometric view of the upper end of the spindle shaft of the "single-pulley" lawn mower cutting blade spindle assembly of FIG. 1; and FIG. 4 is a cross-sectional view of a "dual-pulley" lawn mower cutting blade spindle assembly constructed in accordance with a second embodiment of the present invention.

DETAILED DESCRIPTION OF THE INVENTION

The present invention is directed to a lawn mower cutting blade spindle assembly having a cutting blade that can withstand impact loading and that can easily be detached from the mower without disturbing the pre-set compression applied to the other components of the spindle assembly. While the present invention will be described hereinbelow with regard to a "single pulley" embodiment (see FIGS. 1–3) and a "dual pulley" embodiment (see FIG. 4), it should be understood that various design modifications could be made to these embodiments without departing from the scope of the present invention.

"Single-Pulley" Lawn Mower Cutting Blade Spindle Assembly

Referring to FIGS. 1 and 2, a "single-pulley" lawn mower cutting blade spindle assembly 10 is shown, constructed in accordance with a first embodiment of the present invention. Referring first to FIG. 1, assembly 10 includes a spindle housing 12 that is configured to mount to the frame of a lawn mower. Housing 12 is generally circular in cross-section and includes a flange 14 that extends radially outward from the longitudinal axis of housing 12. A plurality of mounting holes 16 are cut into flange 14 for receiving a plurality of attachment bolts or other type of suitable fasteners. In the illustrated embodiment, six mounting holes are evenly spaced around the circumference of flange 14 so as to securely mount housing 12 to the mower frame. As best shown in FIG. 2, housing 12 defines a cavity 18 therein that is configured to house a spindle 20, lower and upper bearings 34 and 36 and a bearing spacer 38. Housing 12 may be formed of any rigid material known in the art, and is preferably formed of cast iron or other suitable cast or machined metal.

Looking to FIG. 2, assembly 10 also includes a spindle 20 that can be inserted upwardly through cavity 18 of housing 12. Spindle 20 includes an elongate spindle shaft 22 that extends from a lower end 24 to an upper end 26 with a longitudinal bore 27 (see FIG. 3) extending therethrough. Projecting radially outward from the longitudinal axis of spindle shaft 22 at lower end 24 is a spindle shoulder 28. In the illustrated embodiment, spindle shoulder 28 is integrally formed with spindle shaft 22. However, spindle shoulder 28 could be a separate component welded or otherwise attached to lower end 24 of spindle shaft 22. Spindle 20 may be formed of any rigid material known in the art, and is preferably formed of steel.

As will be described in greater detail hereinbelow, the bottom face of spindle shoulder 28 frictionally engages a cutting blade 64 (or one or more blade spacers 66 inserted between spindle shoulder 28 and cutting blade 64) to prevent rotational movement between spindle 20 and cutting blade 64 during operation of the mower. It will also be seen that the top face of spindle shoulder 28 functions as an abutment surface whereby a pulley 40, pulley spacer 46, upper bearing 36, bearing spacer 38, and lower bearing 34, are maintained in compression between a compression nut 60 and spindle shoulder 28, even when cutting blade 64 is detached from the bottom face of spindle shoulder 28.

Looking to FIG. 3, the upper end 26 of spindle shaft 22 is illustrated in greater detail. Upper end 26 includes an irregular-shaped neck portion 30 that is configured to mate with a corresponding opening 58 (see FIG. 2) formed in mounting hub 44 of pulley 40. In the illustrated embodiment, neck portion 30 is splined. Located directly above neck portion 30 is a threaded portion 32. As shown in FIG. 2, threaded portion 32 extends above opening 58 of mounting hub 44 and receives a compression nut 60 thereon. As will be seen, compression nut 60 can be tightened down against the bottom wall 62 of mounting hub 44 to thereby place pulley 40, pulley spacer 46, upper bearing 36, bearing spacer 38, and lower bearing 34, in compression between compression nut 60 and spindle shoulder 28.

Looking again to FIG. 2, assembly 10 also includes a lower bearing 34, upper bearing 36, and bearing spacer 38 positioned within cavity 18 of housing 12, as is known in the art. Lower bearing 34 is insertable into cavity 18 through the bottom end of housing 12 and is configured to surround spindle shaft 22 near lower end 24. Similarly, upper bearing 36 is insertable into cavity 18 through the top end of housing 12 and is configured to surround spindle shaft 22 near upper end 26. Bearing spacer 38 is generally tubular in shape and provides spacing between lower bearing 34 and upper bearing 36. Together, lower and upper bearings 34 and 36 and bearing spacer 38 form a bearing assembly which provides rotational support for spindle 20 within housing 12. Of course, variations in the number and placement of the bearings and/or bearing spacers are possible without departing from the scope of the present invention.

Looking to FIGS. 1 and 2, assembly 10 also includes a pulley 40 mounted on upper end 26 of spindle shaft 22. Pulley 40 has a disk-shaped body 42 with a central mounting hub 44 extending therebelow (see FIG. 2). Assembly 10 also optionally includes a ring-shaped pulley spacer 46 interposed between the bottom wall 62 of mounting hub 44 and upper bearing 36.

As best shown in FIG. 1, pulley body 42 has a generally planar top surface 48 with an upwardly projecting outer lip 50, and an opposing generally planar bottom surface 52 with a downwardly projecting outer lip 54. In the illustrated embodiment, top and bottom surfaces 48 and 52 are integrally formed with each other such that outer lips 50 and 54 define a circular groove 56 around the outer edge of pulley body 42. As is known in the art, a drive belt (not shown) driven by a conventional mower engine is operatively engaged within groove 56 to cause rotation of pulley 40.

Looking to FIG. 2, mounting hub 44 of pulley 40 extends below pulley body 42 and includes an opening 58 that is insertable over the upper end 26 of spindle shaft 22. The inside surface of opening 58 is splined so as to mate with neck portion 30 of spindle shaft 22. As such, spindle 20 is fixed for rotation with pulley 40. As an alternative to this splined connection, a keyway could be formed through mounting hub 44 and spindle shaft 22 such that a key inserted therethrough would fix spindle shaft 20 for rotation with pulley 40. As another alternative, the sidewall of mounting hub 44 could have a flattened portion that engages a corresponding flattened portion on the sidewall of spindle shaft 22. Of course, any configuration that prevents rotational movement between spindle 20 and pulley 40 during operation of the mower could be used.

It should be noted that opening 58 is sunk down below downwardly extending lip 54 of pulley body 42. As such, the compression nut 60 and a cutting blade attachment nut 74 (described hereinbelow) can both be positioned within mounting hub 44 so as to allow additional top clearance for the mower hood that mounts over assembly 10.

Looking again to FIG. 2, in order to achieve optimum mower performance, pulley 40, pulley spacer 46, upper bearing 36, bearing spacer 38, and lower bearing 34, are placed in compression against the top face of spindle shoulder 28 during the initial factory assembly (or perhaps thereafter during service work performed in a maintenance shop). To accomplish this, a compression nut 60 is provided which can be screwed onto threaded portion 32 of spindle shaft 22 and tightened down against the bottom wall 62 of mounting hub 44. As compression nut 60 is tightened, bottom wall 62 presses against pulley spacer 46, which presses against upper bearing 36, which presses against bearing spacer 38, which in turn presses against lower bearing 34, which finally presses against and abuts the top face of spindle shoulder 28. As such, these components are all put in compression between compression nut 60 and spindle shoulder 28 during the initial factory assembly.

For optimum mower performance, the torque placed on compression nut 60 should have a value of 40 to 60 foot-pounds, and preferably has a value of at least 50 foot-pounds. It has been determined that this amount of torque is sufficient to maintain pulley 40, pulley spacer 46, upper bearing 36, bearing spacer 38, and lower bearing 34 in compression between compression nut 60 and spindle shoulder 28 and thereby prevent these components from becoming loose and failing due to premature wear.

Looking again to FIG. 2, assembly 10 also includes a conventional cutting blade 64 attached to the bottom face of spindle shoulder 28. As is known in the art, one or more blade spacers 66 can be inserted between cutting blade 64 and the bottom face of spindle shoulder 28 whereby the height of cutting blade 64 can be adjusted by changing the number of blade spacers 66 inserted therebetween.

Referring to FIGS. 1 and 2, in order to attach cutting blade 64 and blade spacers 66 (if any) to the bottom face of spindle shoulder 28, assembly 10 also includes an elongate through-bolt 68. Through bolt 68 extends from a head end 70 to a threaded end 72 and may be, for example, a conventional hex head cap screw, grade 5 or grade 8 bolt. Of course, other types of bolts or fasteners may be used.

As best shown in FIG. 2, through-bolt 68 passes upwardly through a central mounting hole of cutting blade 64, through blade spacers 66 (if any), and through longitudinal bore 27 of spindle shaft 22. As can be seen, the threaded end 72 of through-bolt 68 extends above the upper end 26 of spindle shaft 22 and receives a cutting blade attachment nut 74 thereon. A spacer 76 can optionally be inserted between cutting blade attachment nut 74 and compression nut 60.

It should be apparent that cutting blade attachment nut 74 can be screwed onto threaded end 72 of through-bolt 68 to thereby attach cutting blade 64 to the bottom face of spindle shoulder 28 for rotation with spindle 20. The torque placed on cutting blade attachment nut 74 should have a value of 60 to 90 foot-pounds, and preferably has a value of at least 80 foot-pounds, which can easily be applied in the field using ordinary tools. It has been determined that this amount of torque allows cutting blade attachment nut 74 to be sufficiently tightened onto threaded end 72 of through-bolt 68 to prevent relative movement between cutting blade 64 and spindle 20 when cutting blade 64 encounters thick vegetation, tree branches, stones, or other large objects that can retard or prevent rotation of cutting blade 64.

As stated hereinabove, the user of the lawn mower will periodically find it necessary to detach and reattach cutting blade 64 from and to the mower for the purpose of sharpening the blade, adjusting the height of the cut, or for general maintenance purposes. To detach cutting blade 64 from the mower, the user merely has to unscrew cutting blade attachment nut 74 (and spacer 76) from threaded end 72 of through-bolt 68, dismount through-bolt 68 from spindle 20, and remove cutting blade 64 (and any blade spacers 66) from through-bolt 68. After the maintenance has been performed, the user can reattach cutting blade 64 to the mower by placing cutting blade 64 (and any blade spacers 66) over through-bolt 68, mounting through-bolt 68 into spindle 20, and screwing cutting blade attachment nut 74 (and spacer 76) onto threaded end 72 of through-bolt 68.

Thus, it can be seen that the user can detach and reattach cutting blade 64 from and to the mower without disturbing the pre-set compression placed on pulley 40, pulley spacer 46, upper bearing 36, bearing spacer 38, and lower bearing 34 between compression nut 60 and spindle shoulder 28, during the initial factory assembly.

"Dual-Pulley" Lawn Mower Cutting Blade Spindle Assembly

Referring to FIG. 4, in accordance with a second embodiment of the present invention, a "dual-pulley" lawn mower cutting blade spindle assembly 110 includes a spindle housing 112 with a spindle 120 positioned therein. One use for such a dual-pulley arrangement would be that, in certain configurations of lawn mowers, it may be more convenient to drive the outer spindles off the inner spindle rather than directly off the drive pulley. The use of a dual-pulley spindle assembly makes this drive arrangement possible. In the embodiment shown, the spindle 120 in turn includes an elongate spindle shaft 122 and a spindle shoulder 128. Also positioned within the spindle housing 112 are a lower bearing 134, an upper bearing 136, and a bearing spacer 138. All of the above components have substantially the same configuration as the corresponding components of assembly 10 of the first embodiment. In addition, assembly 110 includes a first pulley 140 mounted above a second pulley 180 on the upper end of spindle shaft 122.

Pulley 140 has a disk-shaped body 142 with a central mounting hub 144 extending therebelow. Pulley body 142 has a generally planar top surface 148 with an upwardly projecting outer lip 150, and an opposing generally planar bottom surface 152 with a downwardly projecting outer lip 154. Top and bottom surfaces 148 and 152 are integrally formed with each other such that outer lips 150 and 154 define a circular groove 156 around the outer edge of pulley body 142. A first drive belt (not shown) driven by a conventional mower engine is operatively engaged within groove 156 to cause rotation of pulley 140.

Mounting hub 144 of pulley 140 extends below pulley body 142 and includes an opening 158 that is insertable over the upper end of spindle shaft 122 in such a manner that spindle 120 is fixed for rotation with pulley 140. In the most preferred embodiment, the inside surface of opening 158 is splined so as to mate with a neck portion 130 of spindle shaft 122. Of course, any configuration that prevents rotational movement between spindle 120 and pulley 140 during operation of the mower could be used.

The configuration of pulley 180 is similar to that of pulley 140 in that it includes a disk-shaped body 182 having a generally planar top surface 188 with an upwardly projecting outer lip 190, and an opposing generally planar bottom surface 192 with a downwardly projecting outer lip 194. Top and bottom surfaces 188 and 192 are integrally formed with each other such that outer lips 190 and 194 define a circular groove 196 around the outer edge of pulley body 192. A second drive belt (not shown) driven by a conventional mower engine is operatively engaged within groove 196 to cause rotation of pulley 180. It should be noted that pulley 180 does not include a central mounting hub, but rather includes a central mounting hole that is insertable over the upper end of spindle shaft 122

Similar to the first embodiment, pulleys 140 and 180, upper bearing 136, bearing spacer 138, and lower bearing 134, are all placed in compression against the top face of spindle shoulder 128 during the initial factory assembly (or perhaps thereafter during service work performed in a maintenance shop). To accomplish this, a compression nut 160 is provided which can be screwed onto a threaded portion 132 of spindle shaft 122 and tightened down against the bottom wall 162 of mounting hub 144. As compression nut 160 is tightened, bottom wall 162 presses against pulley 180, which presses against upper bearing 136, which presses against bearing spacer 138, which in turn presses against lower bearing 134, which finally presses against and abuts the face of spindle shoulder 128 facing toward the lower bearing. As such, these components are all put in compression between compression nut 160 and spindle shoulder 128 during the initial factory assembly. The torque applied to compression nut 160 should be 40 to 60 foot-pounds, and preferably at least 50 foot-pounds, to prevent these components from becoming loose and failing due to premature wear.

Assembly 110 also includes a conventional cutting blade 164 (and one or more blade spacers 166) attached to the bottom face of spindle shoulder 128 with an elongate through-bolt 168 and a cutting blade attachment nut 174. A spacer 176 can optionally be inserted between cutting blade attachment nut 174 and the top face of compression nut 160. As in the first embodiment, the torque applied to cutting blade attachment nut 74 should be 60 to 90 footpounds, and preferably at least 80 foot-pounds. It has been determined that this amount of torque allows cutting blade attachment nut 174 to be sufficiently tightened onto threaded end 172 of through-bolt 168 to prevent relative movement between cutting blade 164 and spindle 120 upon impact loading. Significantly, cutting blade 164 can be detached from and reattached to the mower without disturbing the pre-set compression applied to pulleys 140 and 180, upper bearing 136, bearing spacer 138, and lower bearing 134 between compression nut 160 and spindle shoulder 128, during the initial factory assembly or subsequent maintenance.

While the lawn mower cutting blade spindle assembly of the present invention has been described and illustrated hereinabove with regard to specific embodiments, it should be understood that various design modifications could be made to these embodiments without departing from the scope of the present invention. Therefore, the present invention is not to be limited to these specific embodiments, except insofar as such limitations are included in the following claims.

What is claimed is:

1. A lawn mower cutting blade spindle assembly, comprising:

a spindle comprising an elongate spindle shaft that extends from a lower end to an upper end and a spindle shoulder that projects radially outward from the lower end of the spindle shaft, the spindle shaft having a longitudinal bore extending therethrough;

at least one pulley having a central mounting hub with an opening that mounts over the upper end of the spindle shaft such that the spindle is fixed for rotation with the pulley;

a bearing assembly mounted between the pulley and the spindle shoulder, the bearing assembly configured to provide rotational support for the spindle shaft;

a compression device operable to apply a predetermined amount of compression of the pulley and the bearing assembly against a top surface of the spindle shoulder;

a cutting blade having a central mounting hole, the cutting blade attached to a bottom surface of the spindle shoulder such that the cutting blade is fixed for rotation with the spindle; and a through-bolt having a head at one end and a threaded end opposite the head, the threaded end passing upwardly through the central mounting hole of the cutting blade and the longitudinal bore of the spindle shaft, such that the through-bolt extends all the way through the longitudinal bore of the spindle shaft from the lower end to the upper end;

wherein the cutting blade is detachable from the bottom surface of the spindle shoulder without disturbing the compression applied to the pulley and the bearing assembly against the top surface of the spindle shoulder.

2. The lawn mower cutting blade spindle assembly of claim 1 wherein the opening in the pulley mounting hub has an irregular-shaped cross-section and the upper end of the spindle shaft includes a neck portion having a corresponding irregular-shaped cross-section, and wherein the opening in the pulley mounting hub aligns with the neck portion of the spindle shaft such that the spindle is fixed for rotation with the pulley.

3. The lawn mower cutting blade spindle assembly of claim 2 wherein the opening in the pulley mounting hub and the neck portion of the spindle shaft are splined.

4. The lawn mower cutting blade spindle assembly of claim 1 wherein the bearing assembly comprises a lower bearing surrounding the lower end of the spindle shaft, an upper bearing surrounding the upper end of the spindle shaft, and a bearing spacer interposed between the lower bearing and the upper bearing.

5. The lawn mower cutting blade spindle assembly of claim 1 wherein the upper end of the spindle shaft includes a threaded portion, and wherein the compression device comprises a nut tightened onto the threaded portion of the spindle shaft at a torque sufficient to apply the predetermined amount of compression.

6. The lawn mower cutting blade spindle assembly of claim 5 wherein the torque applied to the nut is 40 to 60 foot-pounds.

7. The lawn mower cutting blade spindle assembly of claim 5 wherein the nut is positioned within the pulley mounting hub when tightened onto the threaded portion of the spindle shaft.

8. The lawn mower cutting blade spindle assembly of claim 1 wherein the spindle assembly further comprises:
  a nut tightened onto the threaded end of the through-bolt extending through the upper end of the spindle shaft at a torque sufficient to attach the cutting blade to the bottom surface of the spindle shoulder such that the cutting blade is fixed for rotation with the spindle.

9. The lawn mower cutting blade spindle assembly of claim 8 wherein the torque placed on the nut has a value of at least 40 to 60 foot-pounds.

10. The lawn mower cutting blade spindle assembly of claim 8 wherein the nut is positioned within the pulley mounting hub when tightened onto the threaded end of the through-bolt.

11. The lawn mower cutting blade spindle assembly of claim 1 further comprising a spindle housing surrounding the spindle and the bearing assembly.

12. A lawn mower cutting blade spindle assembly, comprising:
  a spindle comprising an elongate spindle shaft that extends from a lower end to an upper end and a spindle shoulder that projects radially outward from the lower end of the spindle shaft, the spindle shaft having a threaded portion at its upper end and a longitudinal bore extending therethrough;
  at least one pulley having an opening that mounts over the upper end of the spindle shaft such that the spindle is fixed for rotation with the pulley;
  a bearing assembly mounted between the pulley and the spindle shoulder, the bearing assembly configured to provide rotational support for the spindle shaft;
  a compression nut tightened onto the threaded portion of the spindle shaft at a torque sufficient to compress the pulley and the bearing assembly between the compression nut and a top surface of the spindle shoulder;
  a cutting blade having a central mounting hole;
  a through-bolt having a head at one end and the other end being threaded, the threaded end passing upwardly through the central mounting hole of the cutting blade and the longitudinal bore of the spindle shaft, such that the through-bolt extends all the way through the longitudinal bore of the spindle shaft from the lower end to the upper end; and
  a cutting blade attachment nut tightened onto the threaded end of the through-bolt extending through the upper end of the spindle shaft at a torque sufficient to attach the cutting blade to the spindle shoulder such that the cutting blade is fixed for rotation with the spindle;
  wherein the cutting blade is detachable from the bottom surface of the spindle shoulder without disturbing the compression placed on the pulley and the bearing assembly between the compression nut and the top surface of the spindle shoulder.

13. The lawn mower cutting blade spindle assembly of claim 12 wherein the torque applied to the compression nut is 40 to 60 foot-pounds, and wherein the torque applied to the cutting blade attachment nut is 60 to 90 foot-pounds.

14. The lawn mower cutting blade spindle assembly of claim 12 wherein the opening in the pulley mounting hub has an irregular-shaped cross-section and the upper end of the spindle shaft includes a neck portion having a corresponding irregular-shaped cross-section, and wherein the opening in the pulley mounting hub engages with the neck portion of the spindle shaft such that the spindle is fixed for rotation with the pulley.

15. The lawn mower cutting blade spindle assembly of claim 14 wherein the opening in the pulley mounting hub and the neck portion of the spindle shaft are splined.

16. The lawn mower cutting blade spindle assembly of claim 14 wherein the neck portion is positioned directly below the threaded portion on the upper end of the spindle shaft.

17. A lawn mower cutting blade spindle assembly, comprising:
  a spindle comprising an elongate spindle shaft that extends from a lower end to an upper end and a spindle shoulder that projects radially outward from the lower end of the spindle shaft, the spindle shaft having a longitudinal bore extending therethrough;
  a first pulley having a central mounting hub with an opening that mounts over the upper end of the spindle shaft such that the first pulley is fixed for rotation with the spindle;
  a bearing assembly mounted between the pulley and the spindle shoulder, the bearing assembly configured to provide rotational support for the spindle shaft;
  a second pulley having a central mounting hub with an opening that mounts over the upper end of the spindle shaft and over the first pulley such that the second pulley is fixed for rotation with the spindle;
  a compression device operable to apply a predetermined amount of compression of the pulleys and the bearing assembly against a top surface of the spindle shoulder;
  a cutting blade having a central mounting hole, the cutting blade attached to a bottom surface of the spindle shoulder such that the cutting blade is fixed for rotation with the spindle; and
  a through-bolt having a head at one end and a threaded end opposite the head, the threaded end passing upwardly through the central mounting hole of the cutting blade and the longitudinal bore of the spindle shaft, such that the through-bolt extends all the way through the longitudinal bore of the spindle shaft from the lower end to the upper end;
  wherein the cutting blade is detachable from the bottom surface of the spindle shoulder without disturbing the compression applied to the pulleys and the bearing assembly against the top surface of the spindle shoulder.

18. The lawn mower cutting blade spindle assembly of claim 17 wherein the opening in each of the pulley mounting hubs has an irregular-shaped cross-section and the upper end of the spindle shaft includes a neck portion having a corresponding irregular-shaped cross-section, and wherein the opening in each of the pulley mounting hubs aligns with the neck portion of the spindle shaft such that the pulleys are fixed for rotation with the spindle.

19. The lawn mower cutting blade spindle assembly of claim 18 wherein the opening in the pulley mounting hubs and the neck portion of the spindle shaft are splined.

20. The lawn mower cutting blade spindle assembly of claim 17 wherein the bearing assembly comprises a lower bearing surrounding the lower end of the spindle shaft, an upper bearing surrounding the upper end of the spindle shaft, and a bearing spacer interposed between the lower bearing and the upper bearing.

21. The lawn mower cutting blade spindle assembly of claim 17 wherein the upper end of the spindle shaft includes a threaded portion, and wherein the compression device comprises a nut tightened onto the threaded portion of the spindle shaft at a torque sufficient to apply the predetermined amount of compression.

22. The lawn mower cutting blade spindle assembly of claim 21 wherein the torque applied to the nut is 40 to 60 foot-pounds.

23. The lawn mower cutting blade spindle assembly of claim 21 wherein the nut is positioned within the second pulley mounting hub when tightened onto the threaded portion of the spindle shaft.

24. The lawn mower cutting blade spindle assembly of claim 17 wherein the spindle assembly further comprises:

a nut tightened onto the threaded end of the through-bolt extending through the upper end of the spindle shaft at a torque sufficient to attach the cutting blade to the bottom surface of the spindle shoulder such that the cutting blade is fixed for rotation with the spindle.

25. The lawn mower cutting blade spindle assembly of claim 24 wherein the torque applied to the nut is 60 to 90 foot-pounds.

26. The lawn mower cutting blade spindle assembly of claim 24 wherein the nut is positioned within the second pulley mounting hub when tightened onto the threaded end of the through-bolt.

27. The lawn mower cutting blade spindle assembly of claim 17 further comprising a spindle housing surrounding the spindle and the bearing assembly.

* * * * *